(12) United States Patent
Standiford et al.

(10) Patent No.: US 7,092,620 B1
(45) Date of Patent: Aug. 15, 2006

(54) CONVERTING ANALOG VIDEO DATA INTO DIGITAL FORM

(75) Inventors: Sandra L Standiford, Loveland, CO (US); Miles K Thorland, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/368,792

(22) Filed: Aug. 5, 1999

(51) Int. Cl.
*H04N 7/00* (2006.01)
*H04N 5/85* (2006.01)

(52) U.S. Cl. .................................. 386/125; 386/46

(58) Field of Classification Search ............... 386/4, 386/52, 45, 55, 64, 125, 126; 360/13, 15, 360/16, 17; 369/83, 84, 85; H04N 5/76, H04N 9/79, 5/781
See application file for complete search history.

(56) References Cited

U.S. PATENT DOCUMENTS

| | | | | |
|---|---|---|---|---|
| 4,355,338 A | * | 10/1982 | Yamamoto et al. ........... | 360/15 |
| 4,365,313 A | * | 12/1982 | Menezes et al. .............. | 386/52 |
| 4,963,995 A | * | 10/1990 | Lang .......................... | 386/54 |
| 5,216,552 A | * | 6/1993 | Dunlap et al. ................ | 360/15 |
| 5,446,599 A | * | 8/1995 | Lemelson ................... | 386/118 |
| 5,521,841 A | | 5/1996 | Arman et al. | |
| 5,574,845 A | | 11/1996 | Benson et al. | |
| 5,606,655 A | | 2/1997 | Arman et al. | |
| 5,635,982 A | | 6/1997 | Zhang et al. | |
| 5,708,767 A | | 1/1998 | Yeo et al. | |
| 5,732,059 A | * | 3/1998 | Katsuyama et al. .......... | 360/15 |
| 5,956,026 A | | 9/1999 | Ratakonda | |
| 5,990,980 A | | 11/1999 | Golin | |
| 6,052,508 A | * | 4/2000 | Mincy et al. ................. | 386/96 |
| 6,163,510 A | * | 12/2000 | Lee et al. ..................... | 386/55 |
| 6,195,458 B1 | | 2/2001 | Warnick et al. | |
| 6,263,147 B1 | * | 7/2001 | Tognazzini ................... | 386/46 |
| 6,393,054 B1 | | 5/2002 | Altunbasak et al. | |
| 6,591,058 B1 | * | 7/2003 | O'Connor et al. ............ | 386/65 |

FOREIGN PATENT DOCUMENTS

| | | |
|---|---|---|
| EP | 0503480 | 9/1992 |
| EP | 0715307 | 6/1996 |
| GB | 2296600 | 7/1996 |
| WO | WO 94/11995 | 5/1994 |
| WO | WO 98/18255 | 4/1998 |

* cited by examiner

Primary Examiner—Robert Chevalier

(57) ABSTRACT

The inventive stand alone mechanism converts video data from an original format such as VHS or digital video to an optical media such as a CD-RW or DVD-RW and prepare it for use in non-linear computer applications such as video editing and production in a single step conversion process. The inventive mechanism will also insert index markers into the video data. The markers could be time based or scene transition based.

22 Claims, 1 Drawing Sheet

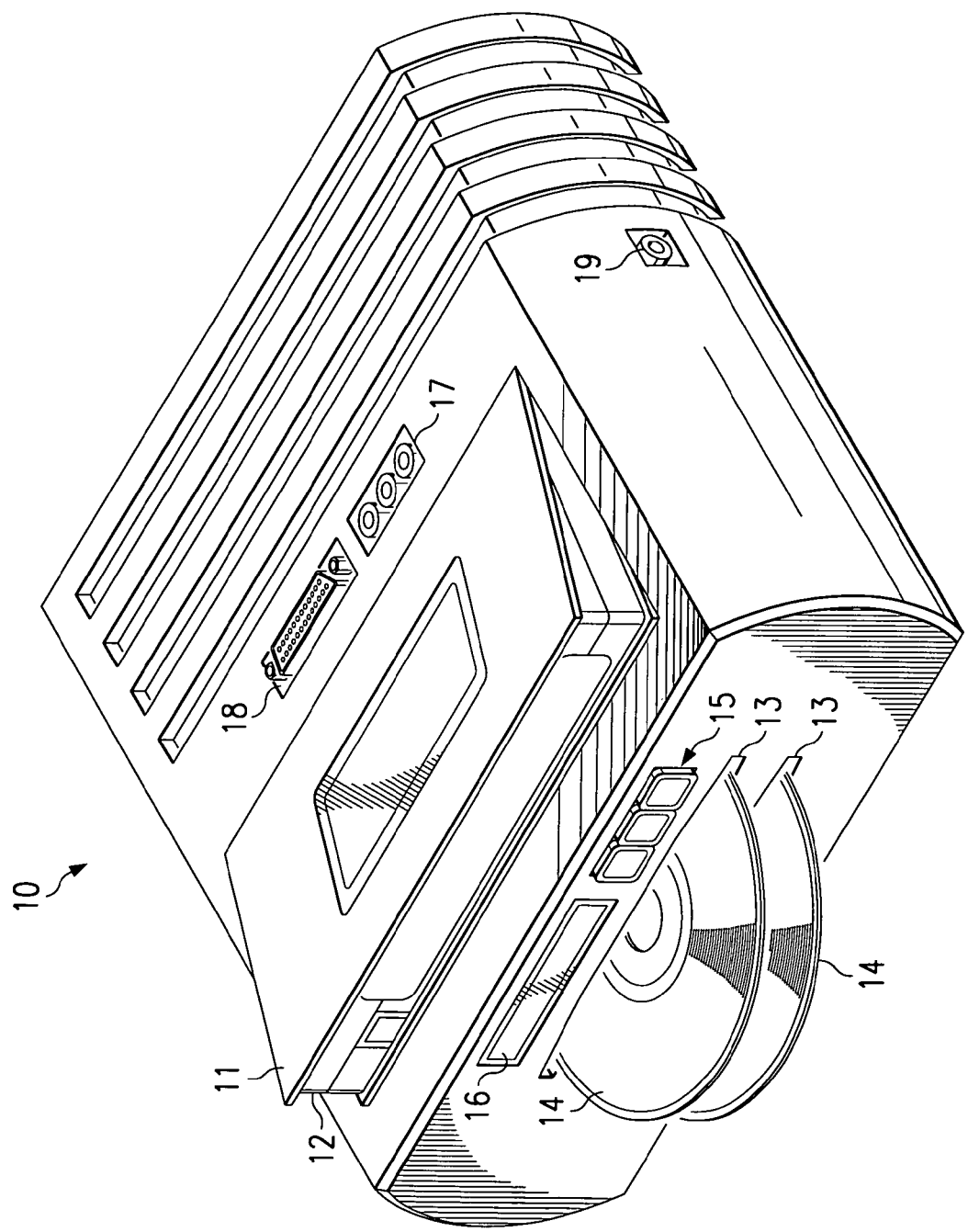

CONVERTING ANALOG VIDEO DATA INTO DIGITAL FORM

RELATED APPLICATIONS

Reference is made to the following co-pending and commonly assigned U.S. Patent Application, entitled "SYSTEM AND METHOD FOR AUTOMATICALLY DETECTING THE KEYFRAMES FROM COMPRESSED VIDEO DATA", Ser. No. 09/062,868, which application is hereby incorporated by reference.

TECHNICAL FIELD OF THE INVENTION

This invention relates in general to video data storage, and in specific to data storage technique conversion.

BACKGROUND THE INVENTION

The photo imaging aspects of personal computer (PC) market is growing. Digital cameras allow for digital image capture. These images are then downloaded from the camera to the PC for processing and printing. The increase in PC processing power is enabling even richer image content to be processed, namely video data. Due to the large size of video data files, video data exceeds the capacity of floppy drives, including large capacity drives such as a ZIP drive, and will quickly fill up hard drives. Thus, there is a strong need for off-line storage, such as CD-RW and DVD media.

Additionally, tens of millions of video cameras have been sold that have recorded millions of hours of video data. This data is stored on magnetic media which degrades over time. The life of a tape is much less than the life span of a person. A tape a person makes of their children when the children are small will probably not be usable when the children are retired. The shelf life of tapes varies greatly with environmental conditions. Typically, tape life is substantially less than the life of optical media like CD, CD-RW, and DVD. Therefore, there is a strong need to preserve data for a longer period of time.

Current computer systems use a video capture unit to convert a video stream into digital video stored on the hard drive. Connection to the PC is through a computer interface such as parallel PCI or SCSI and may be internally or externally mounted. A separate software program controls the capture and compression of video. Currently used compression formats typically include MPEG-1, MPEG-2, AVI, or MJPEG. Another software program would then be used to manipulate or edit the video data once the data is on the hard drive. Editing could include the addition of movie effects such as titling, overlays and transition effects. Yet another software program would then be used to store the video data onto another storage mechanism such as a DVD, tape or CD-RW disc.

One problem with the current technology is installation. Installing the video capture unit and the various software programs is time consuming and tedious. Moreover, the different elements may not be compatible with the host computer system or each other. For example, the video capture unit may not operate with the host computer system because the parallel port of the system does not conform to the standards required by the video capture unit. These challenges are beyond the scope of many video camera users to solve. Also existing host system hardware and software components may interfere with the operation of the video capture unit and video software programs, e.g. the system sound card may inject noise into the video audio signal as the signal is transferred through the parallel port via the video capture unit. These challenges are beyond the scope of many video camera users to solve.

Another problem is that the video capture unit does not index the converted data stream. In other words, the video capture unit does not mark scene transitions, e.g. the transition from a vacation verse video segment to a birthday party video segment. The capture unit merely converts the data stream into a digital stream. Thus, for a user to locate a particular video segment in the stream is difficult and time consuming, as the entire video stream must be linearly reviewed by the user.

Therefore, there is a need in the art for a video data transfer mechanism with automatic indexing that is simple to use, does not require a PC, and allows easier post-processing of video data on most computer systems.

SUMMARY OF THE INVENTION

These and other objects, features and technical advantages are achieved by a system and method which uses a stand alone system for video data conversion. The inventive mechanism would allow a user to transfer data from an original format such as VHS or digital video to an optical media such as a CD-R (read-only Compact Disc), CD-RW (Read/Write Compact Disc) or DVD-RW (Read/Write Digital Video Disc) and prepare it for use in non-linear computer applications, such as video editing and production, in a single step conversion process.

The inventive mechanism has an input slot to receive a video tape. The inventive mechanism would then convert the video data on the video tape into digital video data, and insert index markers at scene changes in the video data. The inventive mechanism would then store the digital data onto CD or DVD discs, as selected by the user. Note that since one video tape typically holds two hours of video data and one CD disc will hold one hour of video data, the inventive mechanism preferably has slots to hold two CD discs. This will allow for transfer onto CD disc without having to prompt the user to replace the CD disc with a blank CD disc. After transfer, the user could then insert the CD or DVD disc(s) into a computer for additional processing. The video disc has the data stored in a standard format such as MPEG-1, MPEG-2 or other, still to be developed format, and thus would be compatible with most computer systems.

Preferably, the inventive mechanism operates without much user intervention. The user would insert the source tape, either one or two CD-RW discs or one DVD-RW disc. The inventive mechanism would then begin to automatically process the data from the source tape. Alternatively, the inventive mechanism would have standard video input connectors. These connectors would allow the inventive mechanism to be connected directly to a video player such as a VCR machine. Thus, the inventive mechanism would utilize the external tape player as the source for the video information.

In a preferred embodiment, in a preferred embodiment, the inventive mechanism will also insert index markers into the video data. The markers could be time based, e.g. every real time ten minutes of video data a marker is inserted. The inventive mechanism could also insert markers based on scene changes, including content changes such as people, buildings, and the like. The inventive mechanism would analyze the video data and determine when the video data has switched to a different scene or segment, and would insert a marker at the transition point. The inventive mechanism can also insert markers based on both time and scene.

The user would be able to select and enter the appropriate marker information via, a user interface, e.g. a key pad or control pad.

Therefore, it is a technical advantage of the present invention to use a stand alone mechanism for converting video data from tape to disc, as it decreases the expense of time, knowledge, and effort currently required to perform this conversion.

It is another technical advantage of the present invention that the time required to capture video into a format usable for video editing and suitable for viewing on a computer would be reduced.

It is a further technical advantage of the present invention that non-linear editing of the captured video can be immediately performed without incurring the cost or spending the time required for manual indexing.

It is a still further technical advantage of the present invention that the discs produced by the inventive mechanism are compatible with many computer systems without special setup or formatting.

It is a still further technical advantage of the present invention that video data can be preserved for a longer period of time without degradation of data than is possible with analog magnetic video tape.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

The FIGURE depicts an inventive video conversion mechanism according to a preferred embodiment of the present invention.

DETAILED DESCRIPTION OF THE INVENTION

The FIGURE depicts an inventive video conversion mechanism 10 according to a preferred embodiment of the present invention. The inventive mechanism is preferably a stand alone device that transfers content from VHS tapes, 8 mm tapes, super VHS tapes, digital video tapes, and/or other sources of video directly to either a compact disc (CD), digital versatile disc (DVD), or a future format. The inventive mechanism is preferably connected to a power supply via power connection 19.

The inventive mechanism 10 includes video tape slot 11 where the user would insert the video data source tape 12. The slot is sized for one of the following video formats: VHS tape, compact VHS tape, 8 mm tape, digital video (DV) tape, or other video tape formats. Note that multiple instantiations of slot 11 may be incorporated into mechanism 10, one slot for each of a plurality of different tape formats.

The inventive mechanism 10 preferably uses known VCR-type technology for the playing of the tape 12. The inventive mechanism 10 also preferably has video input connections 17. These connections 17 allow for a standard tape player, such as a VCR machine or video camera, to be connected to the mechanism 10. Thus, if the mechanism is provided with a portable power supply, via power connection 19, then the inventive mechanism can be used as a portable video storage device for a video camera. Note that connection 17 may be used instead of slot 11 or to supplement slot 11.

A destination slot 13 is provided for the user to insert a destination video data disc 14. Note that since one video tape typically holds two hours of video data, and one CD disc will hold one hour of video data, the inventive mechanism preferably includes a second slot to hold a second CD disc. A second disk would not be necessary where the destination device is a DVD disc. Alternatively, video data can be transferred until a disc is full, at which time the inventive mechanism would prompt the user to replace the disc with a blank disc. The user would preferably identify the type of disc being loaded, either CD or DVD, via control pad 15. Alternatively, the inventive mechanism would be able to determine the type of disc automatically. The inventive mechanism 10 would use known CD/DVD type technology for the recording of the disc 14.

In an alternative preferred embodiment, the inventive data conversion apparatus comprises a disc changer thereby enabling the apparatus to record onto a plurality of CDs using a single recording head. Preferably, the disc changer would comprise a tray having slots for placement of a plurality of discs. When one disc becomes fully loaded with information, the tray would present a subsequent blank disc to the disc recording head. This process would continue until all information on the source video cassette is fully transferred onto the CDs. Alternatively, the recording apparatus would have room for only one CD at a time and would prompt the user to remove a CD which is filled with data and enter a new, blank CD.

After loading the source tape 12 and the destination disc(s) 14, the user would press a start button located on the control pad 15. Alternatively, the inventive mechanism would auto-start after the media loading has been completed. Display 16 would inform the user of the status of the conversion operation, e.g. in progress, real time elapsed, completed, insert blank disc, etc. Note that if the input source is larger than the destination disc, then the mechanism 10 would prompt the user to insert another disc and the conversion operation would resume. The operation would continue until the entire contents of the input source tape 12 had been copied to the destination disc 14. The inventive mechanism 10 would use known analog-to-digital video data conversion technology for the conversion of the video data from the tape to the video data 12 for recording on disc 14. Examples of usable standards for the conversion include, but are not limited to ISO/IEC formats: 13818-1, 13818-2, and 13818-3 (MPEG specification). The user would be able to manually interrupt the operation via a control on control pad 15, if desired. The control pad 15 also includes eject buttons to eject tape 12 and disc(s) 14.

During conversion, the mechanism 10 could be set, via control pad 15, to place markers at particular locations in the converted video data stream. The markers could be time based, such that after a particular amount of real time of video data has been converted, then a marker would be inserted, e.g. after every real time ten minutes of video data, a marker is inserted. The inventive mechanism could also insert markers at key frames based on scene changes, e.g.

one video segment comprises video data of a birthday party, the next sequential segment comprises video data of a ski trip. The inventive mechanism 10 preferably analyzes the video data and determines which frames are key frames (the frame at which a scene change occurs) based on the scene transitions. The inventive mechanism can also insert markers based on both time and scene. With respect to insertion of key frames, reference is hereby made to the commonly assigned Patent Application entitled "SYSTEM AND METHOD FOR AUTOMATICALLY DETECTING THE KEYFRAMES FROM COMPRESSED VIDEO DATA", Ser. No. 09/062,868, which application is hereby incorporated by reference. For example, if a single video segment or scene comprises more than 10 minutes of real time video data, then the inventive mechanism may place an index marker at the 10 minute point. The user would be able to select and enter the appropriate marker information via control pad 15.

Note that the inventive mechanism 10 can convert the video data into a variety of digital formats, e.g. MPEG, AVI, MJPEG, etc. The user can select the desired format, via control pad 15. A default format will be selected by the inventive mechanism 10 if the user does not select the format.

After completion of the conversion, the user may then remove the disc(s) 14 and then either play or edit the video file(s) stored on the disc 14. To edit the disc(s), the user would place the disc(s) 14 into a computer system (or other editing system) that has video editing software. Since the video data is stored in a standard format, most editing programs will be able to manipulate the data. To play the disc(s), the user would place the disc(s) into a computer system or other player that is equipped with the necessary software/hardware to play video files. Since the video data is stored in a standard format, most players will be able to play the data files. Note that the mechanism 10 itself can be used as a video player via video connections 17. The inventive mechanism 10 would also automatically provide thumbnail access to the user when the optical media is inserted into a PC. This would be accomplished by auto-launching a software package that would display the thumbnails to the user.

The mechanism 10 can be connected to a computer system via computer connection 18, e.g. a parallel port. This connection would allow the mechanism to receive upgrades to existing video formats, as well as new digital storage formats. This connection would also allow for other programming or upgrades to be installed. Furthermore, the connection would also allow for trouble shooting and/or maintenance of the mechanism 10. Computer connection 18 could also include a modem connection, and thus, the mechanism 10 could communicate directly with a central system, via a modem that is built into the mechanism, for upgrades, reprogramming, or other maintenance. Modem communications would be initiated by user via control pad 15, or automatically by the mechanism 10.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Apparatus for converting analog video data into digital form, the apparatus comprising:
   an analog video cassette player for producing analog video output;
   an analog to digital converter for converting said analog video output into digital data;
   at least one recorder employing a digital storage medium for storing said digital data, wherein said cassette player, said converter and said storage medium are disposed within a single container wherein said digital storage medium is insertable into and removable from said container; and
   a key frame marker for inserting at least one marker into the digital data.

2. The apparatus of claim 1, further comprising:
   a video port for receiving analog video information from an external source.

3. The apparatus of claim 1, wherein the video cassette player employs a VHS format.

4. The apparatus of claim 1, wherein the digital storage medium is one of a CD R or a CD RW.

5. The apparatus of claim 1, wherein the digital storage medium is a recordable DVD.

6. The apparatus of claim 1, wherein the digital storage medium is selectable by the user.

7. The apparatus of claim 1, further comprising:
   wherein the a key frame marker for marking marks abrupt changes in video image sequences, thereby enabling a user to readily locate a beginning and an end of a particular video sequence.

8. The apparatus of claim 1, further comprising: wherein the a key frame marker for marking marks positions in a sequence of said digital data at selectable time intervals.

9. The apparatus of claim 1, wherein the video cassette player employs the 8 mm format.

10. A method for preserving analog video data in digital form, the method comprising the steps of:
    providing a container;
    producing analog video output from an analog video tape in said container;
    converting said analog video output into digital video data in said container;
    inserting a removable digital storage medium into said container; and
    storing said digital video data in said digital storage medium in said container.

11. The method of claim 10 comprising the further step of:
    determining a required digital storage format prior to said step of converting based upon detection of a format of said inserted storage medium.

12. The method of claim 10 comprising the further step of:
    inserting at least one marker in said digital video data to identify abrupt changes in video scenery, thereby enabling a user to readily identify particular video sequences during playing of said digital video data.

13. The method of claim 10, comprising the further step of:

inserting at least one marker in said digital video data at selectable time intervals, thereby enabling a user to readily move to selected chronological points in a video sequence during playing of said digital video data.

14. The method of claim 10, wherein the digital storage medium is one of CD R or CD RW.

15. The method of claim 10, wherein the digital storage medium is a recordable DVD.

16. The method of claim 10, wherein the digital storage medium is digital tape.

17. The method of claim 10, wherein the analog video tape is in VHS format.

18. The method of claim 10, wherein the analog video tape is in 8 mm format.

19. Apparatus for preserving analog video data in digital form, the apparatus comprising:
a video cassette player for producing analog video output from an inserted video cassette;
an analog to digital converter for converting said analog video output into digital data thereby protecting said data against degradation of over time; and
one of a CD recorder and a DVD recorder for storing said digital data onto at least one inserted digital storage medium, thereby transferring said analog video from said inserted cassette to said inserted digital medium, wherein said video cassette player, said analog to digital converter, and said digital storage medium are disposed within a single container.

20. The apparatus of claim 19, further comprising:
a key frame marker for inserting index markers in said digital data marking abrupt changes in video image sequences, and alternatively, at selectable time intervals.

21. The method of claim 10, further comprising:
removing the digital storage medium from said container after storing said digital video data in said digital storage medium.

22. The apparatus of claim 19 wherein the digital storage medium is insertable into and removable from said single container.

* * * * *